Nov 24, 1953     L. BAER     2,660,108
TOASTER
Filed May 11, 1950
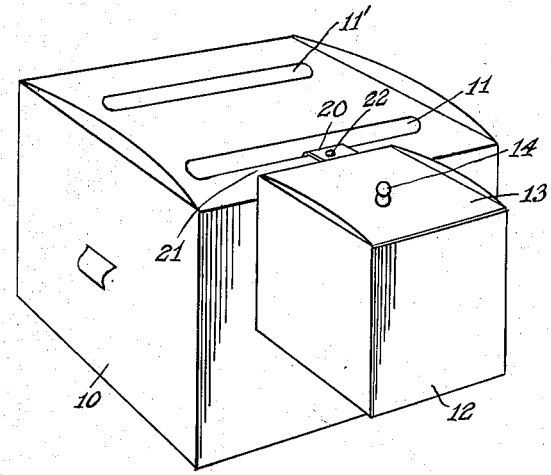
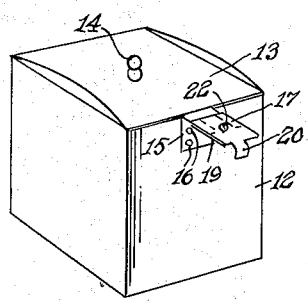
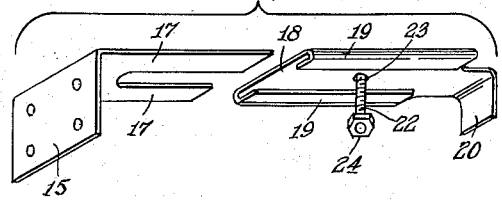
INVENTOR.
LOUIS BAER
ATTORNEY Patented Nov. 24, 1953

2,660,108

UNITED STATES PATENT OFFICE 2,660,108

TOASTER

Louis Baer, Bronx, N. Y.

Application May 11, 1950, Serial No. 161,329

1 Claim. (Cl. 99—339)

1

This invention relates to new and useful improvements in toasters of bread, and it has for its object to provide means, whereby a number of toasted slices of bread may be kept warm until the appropriate time of use of same, such, as for instance, when serving a party, and more especially at the time of serving breakfast.

With the above and other objects in view, this invention consists of the novel features of construction, combination and arrangement of parts, hereinafter fully described, claimed and illustrated in the accompanying drawing forming part of this application, and in which similar characters of reference indicate corresponding parts in all views, and in which:

Figure 1 is a somewhat perspective elevational view of a toaster, of the more or less conventional kind, showing my heated "ready-toast" container connected thereto.

Figure 2 is a view similar to Figure 1, showing the said toast container separately, while Figure 3 is an exploded detail view, showing the parts for attaching the said toast container to the toaster proper.

Referring more particularly to the drawing, the numeral 10 indicates a toasting apparatus, which may be of the conventional kind. Said toaster has the openings 11 and 11' for inserting therein slices of bread to be toasted.

A separate compartment or container 12 adapted to keep the slices of toast warm until the use of same, is detachably secured to the toaster proper in the following manner:

The said container 12 has a lid 13 provided with a knob 14 for removing the latter.

The container has upon one side thereof secured thereto a lug 15 by means of screws 16, as may be seen in Figure 2; said lug terminates in a bifurcated end portion, having the flat projections 17, 17.

A member 18 formed with inwardly bent flanges 19, 19 adapted to partly encompass and to telescope on the portions 17, 17, is mounted upon the latter.

The said member 18 terminates in a hook-like portion 20 adapted to engage the nearest opening 11 in the toaster, when the latter is provided with more than one opening for the insertion of slices of bread to be toasted.

The purpose of the member 18 is to enable the said container 12, with ready made slices of bread, or toast, to be detachably hitched on to the toaster proper, even where the wall 21 of the latter is of various width, so as to keep said container hot by the transmission of heat from the close contact of the container with the toaster 10.

Thus, if the wall 21 of the toaster is broad, or wide, the member 18 will meet this condition by telescoping on the portions 17, 17 until the relative close connection between the toast container and the toaster 10 is obtained.

2

When thus suitably positioned, and the hook-shaped portion 20 of the member 18 engages the opening 11 in the toaster, a bolt 22 is inserted through an orifice 23 in the member 18, while a proportionately broad screw nut 24 threaded upon the lower end of the bolt 22, secures the member fixedly to the portions 17, 17, thus forming a stable connection between the toaster and the toast container.

It is obvious that changes may be made in the form, construction and arrangement of the several parts, as shown, within the scope of the appended claim, without departing from the spirit of the invention, and I do not, therefore, wish to limit myself to the exact construction shown and described herein.

What I claim as new, and desire to secure by Letters Patent of the United States, is:

In a device of the class described, the combination of a toaster apparatus and a heating compartment, said toaster apparatus being formed with a plurality of oblong openings at the top adapted to receive pieces of toast and for adjustability with said heating compartment, the latter being provided with a lid having a knob at the top, a lug fixedly attached upon one side of the compartment, screws securing said lug to the latter, bifurcated end portions at the end of said lug and integral therewith, said end portions being formed with flattened projections, a member formed with inwardly bent flanges adapted to partly encompass and telescope on said projections, a hook-like portion at one end of said member and adapted to adjustably engage one of said openings in the toaster apparatus, one of said flanges being formed with an orifice, and a bolt made to enter said orifice and adapted to secure one of said flanges to one of said end portions, when said hook is adjustably arranged relative to the toaster apparatus.

LOUIS BAER.

References Cited in the file of this patent

UNITED STATES PATENTS

| Number | Name | Date |
|---|---|---|
| 735,716 | Dahlquist | Aug. 11, 1903 |
| 736,416 | Medina | Aug. 18, 1903 |
| 1,714,536 | Wooderson | May 28, 1929 |
| 2,040,479 | Glore | May 12, 1936 |
| 2,368,440 | Barker | Jan. 30, 1945 |
| 2,415,604 | Nalley | Feb. 11, 1947 |
| 2,435,704 | Wilkinson | Feb. 10, 1948 |
| 2,456,291 | Malone | Dec. 14, 1948 |

FOREIGN PATENTS

| Number | Country | Date |
|---|---|---|
| 21,662 | Great Britain | of 1891 |
| 450,069 | Germany | Sept. 27, 1927 |